United States Patent
von Seggern

(10) Patent No.: US 7,900,423 B2
(45) Date of Patent: Mar. 8, 2011

(54) METHOD FOR THE GASTIGHT PACKAGING OF OBJECTS USING A FILM MATERIAL FITTING TIGHTLY ON THE OBJECTS AND A DEVICE FOR THE GASTIGHT PACKAGING OF OBJECTS

(75) Inventor: Jörg von Seggern, Oldenburg (DE)

(73) Assignee: Jörg von Seggern Maschinenbau GmbH, Oldenburg (DE)

( * ) Notice: Subject to any disclaimer, the term of this patent is extended or adjusted under 35 U.S.C. 154(b) by 0 days.

(21) Appl. No.: 12/218,496

(22) Filed: Jul. 15, 2008

(65) Prior Publication Data

US 2008/0313997 A1 Dec. 25, 2008

Related U.S. Application Data

(62) Division of application No. 11/493,781, filed on Jul. 26, 2006, now Pat. No. 7,712,289.

(30) Foreign Application Priority Data

Jul. 26, 2005 (DE) .......................... 10 2005 035 476

(51) Int. Cl.
*B65B 61/02* (2006.01)
*B65B 55/00* (2006.01)

(52) U.S. Cl. .............................. 53/432; 53/510; 426/936

(58) Field of Classification Search ................. 53/432, 53/433, 510, 511, 559; 426/392, 396
See application file for complete search history.

(56) References Cited

U.S. PATENT DOCUMENTS

| | | | | |
|---|---|---|---|---|
| 3,481,100 | A * | 12/1969 | Bergstrom | 53/433 |
| 3,634,993 | A * | 1/1972 | Pasco et al. | 53/433 |
| 3,665,673 | A | 5/1972 | Billett et al. | |
| 3,706,183 | A | 12/1972 | Talarico | |
| 3,908,334 | A | 9/1975 | Rychiger | |
| 4,162,559 | A | 7/1979 | Kyle | |
| 4,162,599 | A * | 7/1979 | Kyle | 53/77 |
| 4,424,659 | A * | 1/1984 | Perigo et al. | 53/425 |
| 4,685,274 | A * | 8/1987 | Garwood | 53/433 |
| 4,838,008 | A * | 6/1989 | Hardy | 53/407 |
| 5,103,618 | A * | 4/1992 | Garwood | 53/433 |
| 5,155,974 | A * | 10/1992 | Garwood | 53/510 |
| 5,560,182 | A * | 10/1996 | Garwood | 53/432 |
| 5,577,370 | A | 11/1996 | Pajak et al. | |
| 5,689,937 | A * | 11/1997 | Gorlich et al. | 53/433 |
| 5,718,101 | A * | 2/1998 | Noel et al. | 53/432 |
| 5,744,181 | A * | 4/1998 | Sornay et al. | 426/106 |

(Continued)

FOREIGN PATENT DOCUMENTS

AT 2 65 973 A 11/1965

(Continued)

*Primary Examiner* — Paul R Durand
(74) *Attorney, Agent, or Firm* — Collard & Roe, P.C.

(57) ABSTRACT

In the case of a method for the gastight packaging of objects using a film material fitting tightly on the objects using a vacuum, the object being placed in a tray and a deep-drawable film being attached to the tray for sealing, it is provided that a tray having at least one peripheral rim is used to form the packaging, the deep-drawable film is cut to the size of the peripheral rim, and that the deep-drawable film is subsequently and/or simultaneously applied to the peripheral rim in a gastight manner.

A device preferably for carrying out this method has at least one cutting device for the deep-drawable film.

4 Claims, 4 Drawing Sheets

U.S. PATENT DOCUMENTS

| | | | |
|---|---|---|---|
| 5,779,050 A * | 7/1998 | Kocher et al. | 206/497 |
| 5,943,844 A * | 8/1999 | Wilhelm et al. | 53/442 |
| 6,202,388 B1 * | 3/2001 | Sanfilippo et al. | 53/432 |
| 6,351,928 B2 * | 3/2002 | Torre | 53/556 |
| 6,408,598 B1 * | 6/2002 | Stockley, III | 53/433 |
| 6,834,476 B2 * | 12/2004 | Konishi | 53/329.5 |
| 6,912,828 B1 * | 7/2005 | Yamay | 53/432 |
| 7,269,932 B2 * | 9/2007 | Konishi | 53/329.5 |
| 2003/0196412 A1 | 10/2003 | Foulke, Jr. | |
| 2005/0257501 A1 * | 11/2005 | Natterer | 53/432 |

FOREIGN PATENT DOCUMENTS

| | | |
|---|---|---|
| DE | 23 47 047 C2 | 3/1974 |
| DE | 695 14 093 T2 | 4/2000 |
| DE | 100 31 356 B4 | 1/2002 |
| DE | 102 37 933 A1 | 2/2004 |
| EP | 09 49 147 A1 | 10/1999 |
| FR | 2 565 552 A1 | 12/1985 |
| FR | 2 725 692 A1 | 4/1996 |
| WO | WO 88/01592 A | 3/1988 |
| WO | WO 2004/022431 | 3/2004 |

* cited by examiner

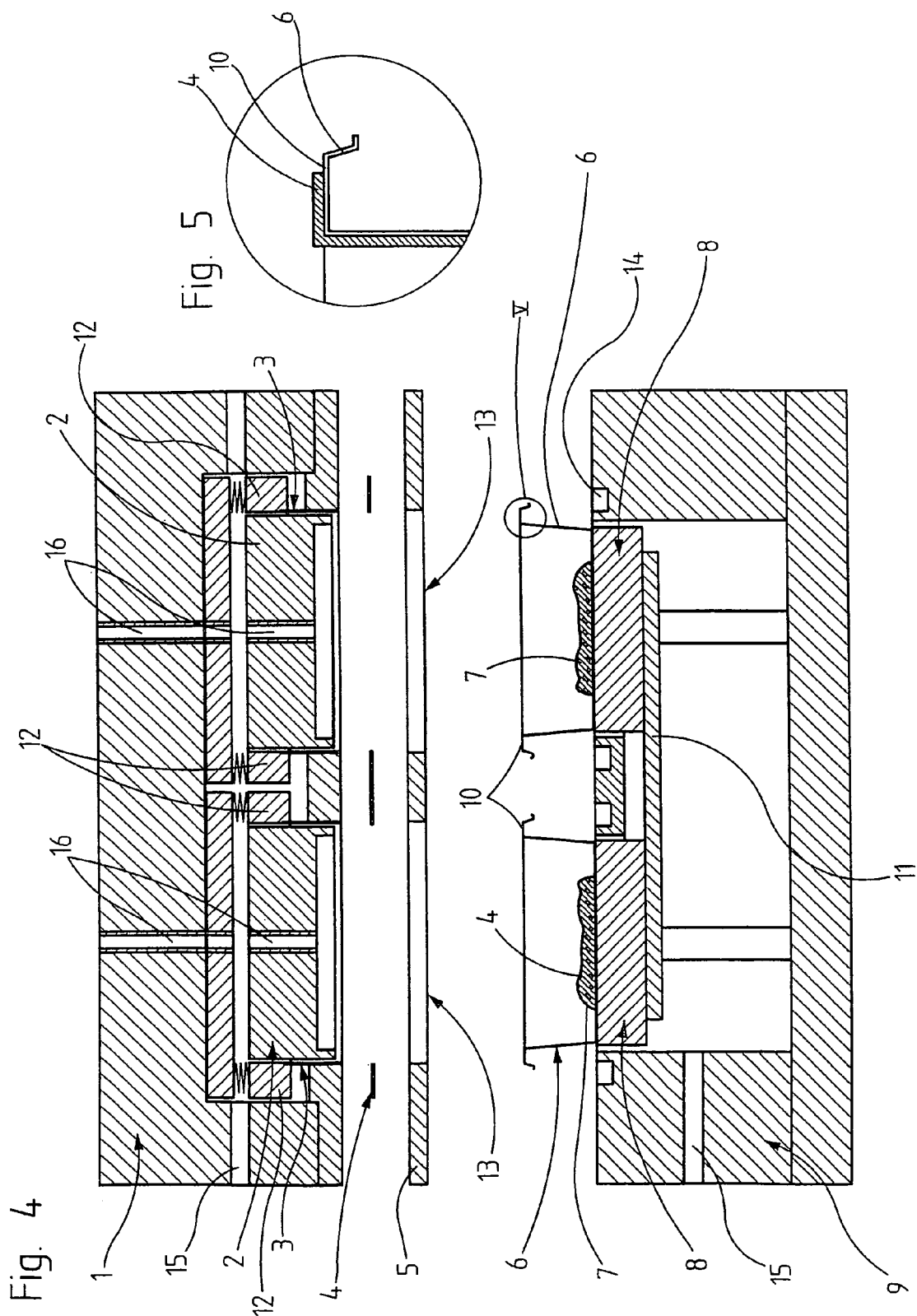

METHOD FOR THE GASTIGHT PACKAGING OF OBJECTS USING A FILM MATERIAL FITTING TIGHTLY ON THE OBJECTS AND A DEVICE FOR THE GASTIGHT PACKAGING OF OBJECTS

CROSS REFERENCE TO RELATED APPLICATIONS

This application is a divisional of U.S. patent application Ser. No. 11/493,781, filed on Jul. 26, 2006, now U.S. Pat. No. 7,712,289, which application claims priority under 35 U.S.C. §119 of German Application No. 10 2005 035 476.9 filed Jul. 26, 2005.

BACKGROUND AND SUMMARY OF THE INVENTION

The present invention relates to a method for the gastight packaging of objects using a film material fitting tightly on the objects using a vacuum, the object being placed in a tray and a deep-drawable film being attached to the tray for sealing.

The present invention also relates to a device for the gastight packaging of objects using a film material fitting tightly on the objects using a vacuum, preferably for carrying out the abovementioned method, including a supporting surface for at least one tray and at least one sealing tool for the deep-drawable film. Finally, the present invention relates to a packaging.

The method and devices of the abovementioned species are used to package objects. These objects may be inorganic products, such as tools or stationery, which are kept for sale in corresponding packaging. In particular when a vacuum is used to deep-draw the film that is heat-sealed to the tray, the objects may be organic products, such as foodstuffs. Meats and sausages in particular are packaged using this type of packaging in order to ensure the smallest possible gas volume in the interior space of the packaging.

In the known methods an object is placed in a tray and the deep-drawable film is then heat-sealed to the tray. After the deep-drawing operation, the film is cut to the size of the tray, which often includes cutting of the film and tray in one step, e.g., when the tray shifts. This may disadvantageously result in sharp tray edges. A further disadvantage is that this subsequent cutting is performed on film that is still heated for the heat-sealing process. The film in its heated state has a soft consistency so that it is only able to provide minimal resistance to a cutting knife. This results in jagged edges causing unattractive creasing and warping of the cut film edges.

The object of the present invention is to provide a method for packaging objects in attractive gastight packaging. A device facilitating such a packaging method and a packaging are also to be provided.

With respect to the method, this object is achieved according to the present invention in that a tray having a peripheral rim is used to form the packaging, the deep-drawable film is cut to the size of the peripheral rim, and in that the deep-drawable film is applied subsequently and/or simultaneously to the peripheral rim in a gastight manner.

A tray having a peripheral rim is also used in the method according to the present invention. However, this peripheral rim is not damaged during the packaging of an object so that this rim may be provided in advance with an attractive grippable edge or other design. According to the present invention, the peripheral rim of the tray is protected in that the deep-drawable film is cut to size prior to being applied to the peripheral rim.

Therefore the processing sequence in the method of the present invention is the reverse of that of the related art. The film is first cut to size and then applied. This has the advantage that the film is cut in the cold state. In this state, the film is hardened so that smooth edges are able to be cut. The creation of ripples and warping is advantageously prevented. Cutting of the film after the heat-sealing operation, i.e., in the heated state, is also prevented. The peripheral rims of the tray are also not cut since the film is cut in its cold state in a manner in which the cutting tools provided for this purpose do not come into contact with the tray. A rim structure of the tray is therefore maintained and sharp cut edges advantageously do not occur.

According to a first further refinement of the method of the present invention, the deep-drawable film is heat-sealed onto the peripheral rim. The heat-sealing creates a secure and gastight connection between the film and the tray. The heat-sealing of the film previously cut to size also heats the film so that it is suitable for a subsequent or simultaneous deep-draw operation due to its heated state. The deep-drawable film is able to be expanded easily in this state.

To be able to perform the deep-drawing operation, a further refinement of the present invention provides for a vacuum to be positioned in the surrounding region of the tray. The vacuum may be used to set pressure conditions so that deep-drawing of the film results in response to the formation of a pressure drop. The deep-drawing operation causes the film to fit tightly on the object to be packaged as well as on areas of the tray not occupied by the object according to the skin method.

In a further refinement of the method according to the present invention, an overpressure may be formed in the surrounding region of the deep-drawable film on the side facing away from the tray. The overpressure formable on the side of the deep-drawable film facing away from the tray may be applied to this side. This supports the vacuum on the other side of the deep-drawable film in order to achieve the tightest possible fitting of the deep-drawable film on the object to be packaged. This tight fit namely advantageously ensures not only that the object is fixed in place but also, for example in the case of objects containing meat, that liquids in the meat are not able to escape. Therefore, a marinade or the meat's own juice is able to be contained in the product so that the product does not dry out and stays fresh despite the longer shelf life achieved by the packaging. The overpressure may be generated quickly to achieve faster and tighter fitting of the film.

With respect to achieving the device objective, the present invention provides for the device to have a supporting surface for at least one tray, the sealing tool for the deep-drawable film, as well as at least one cutting device for the deep-drawable film.

According to the method of the present invention, the film is first cut to size and then applied to the tray. Due to this procedure, a separate cutting station for the film is no longer necessary. According to the present invention, it may be assigned to the device since the film is cut in advance or at the same time as the sealing or heat-sealing of the film.

The cutting device preferably includes knife blades which are able to successfully cut the deep-drawable film.

According to another further refinement of the device according to the present invention, the cutting device is spatially assigned to the sealing tool. This spatial assignment renders possible simultaneous cutting and sealing or cutting followed by sealing. Although the cutting device and sealing tool are spatially assigned to one another, both assemblies are structurally independent of one another so that the cutting and sealing work steps may be performed separately.

The cutting device is able to move around the sealing tool. If the sealing tool has a rectangular design, for example, the knife blades of the cutting device are able to move around this sealing tool like a frame. Prior to the sealing tool being applied to the film, the knife blades configured in a frame-like manner cut the film to size.

With respect to the structural design of the device, a further refinement of the present invention provides for the supporting surface for the tray and/or the sealing tool to be designed to be height-adjustable. As a result, the supporting surface and the sealing tool are able to be moved together and moved apart. The moving together motion is used to apply the sealing tool to the deep-drawable film when the film is fitted to the peripheral rim of the tray.

According to another further refinement of the present invention, the supporting surface has at least one supporting apparatus for the peripheral rim of the tray. The tray is able to be inserted into the supporting apparatus for the peripheral rim via the supporting surface. The peripheral rim is preferably positioned on this supporting apparatus so that it is ready for the heat-sealing or sealing with the deep-drawable film. The supporting apparatus supports the peripheral rim and forms a counter support for the sealing tool to be applied to the rim.

According to another further refinement of the device of the present invention, a spacer plate which may be placed on the supporting apparatus for the peripheral rim is situated between the trays and the deep-drawable film, the peripheral rim remaining at least sectionally free in this process. This spacer plate provided according to the present invention supports the advance cutting to size of the deep-drawable film before it is heat-sealed or sealed onto the peripheral rim of the tray. This spacer plate may be placed for this purpose on the peripheral rims of the tray accommodated in the supporting apparatus. The top surface of the spacer plate now forms a plane situated above the peripheral rim. The deep-drawable film may be placed on this plane and the cutting device may be applied to the deep-drawable film on this plane. Once the deep-drawable film has been cut to size, it falls through the spacer plate onto the peripheral rims. These peripheral rims are not covered by the spacer plate. The other regions of the tray may also remain free so that the sealing tool may be applied to a large surface in order to heat-seal the deep-drawable film while simultaneously heating it for a subsequent or simultaneous deep-draw operation. At least one opening able to be positioned to have the same coverage as the container is preferably situated in the spacer plate. This opening then has dimensions corresponding to those of the sealing tool.

When using this spacer plate with the openings, it is advantageous to spatially assign the cutting device to the sealing tool. When moving the sealing tool to the deep-drawable film, the cutting device may be moved in at the same time. The cutting device is preferably able to be moved past an edge of the opening in the spacer plate at a close distance so that a trimming effect results between a knife blade of the cutting device and this edge of the opening, thereby cutting the still cold deep-drawable film while producing a clean cut edge. In this context, the cutting tool is preferably decoupled from the sealing tool and spring-suspended. This decoupling makes it possible for the sealing tool to be moved closer to the tray than the cutting tool. After this moving in of the sealing tool, sealing may be performed between the film and tray while the cutting tool remains in a position removed from the tray so that the peripheral rim of the tray is not damaged.

According to another embodiment of the device of the present invention, at least one overpressure line preferably runs through the sealing tool. The sealing tool is situated on the side of the deep-drawable film facing away from the tray. An overpressure medium, e.g. air, may be supplied via the overpressure line running through the sealing tool in order to generate an overpressure preferably provided according to the method on this side of the film.

Independent protection is also claimed for a packaging produced according to the method of the present invention. According to the present invention, this packaging is characterized in that after placement of the deep-drawable film on at least one peripheral rim of the tray, this rim is sectionally covered.

Therefore, according to the present invention, the film placed on the peripheral rim does not completely cover this rim. The film may have an offset with respect to the outer edge of the peripheral rim so that it does not come into contact with this rim. It may be heat-sealed to a region of the peripheral rim at a distance from the outer edge of the peripheral rim. This produces a clean seam.

In this context, a peripheral rim of the tray is always the region of the tray surface enclosing the periphery of at least one depression in the tray. The tray may have a single depression surrounded by a peripheral rim. It is also possible for a plurality of depressions to be situated in one packaging, for example in the case of a plurality of yogurt containers. A separate deep-drawable film may be assigned to each of these depressions and attached only to the peripheral rim of the individual depression. As a result, the various depressions are not covered with one film but instead a plurality of films is provided. This packaging has regions not covered by film between the individual depressions. Perforations may then preferably be introduced in these regions to facilitate separation of the individual packaging regions. In this case pull-off tabs of the deep-drawable film may also moved from a position in the outer region of the total packaging to an inner region, e.g. to where the deep-drawable films of a plurality of depressions are close to one another.

An exemplary embodiment of the device of the present invention from which other inventive features arise is displayed in the drawing. The figures show:

BRIEF DESCRIPTION OF THE DRAWINGS

FIGS. 1 through 4 show sectional views of a device for the gastight packaging of objects using a film material fitting tightly on the objects in various processing situations during a packaging operation; and FIG. 5 shows an enlarged representation of detail V in FIG. 4.

DETAILED DESCRIPTION OF THE INVENTION

Figure 1:
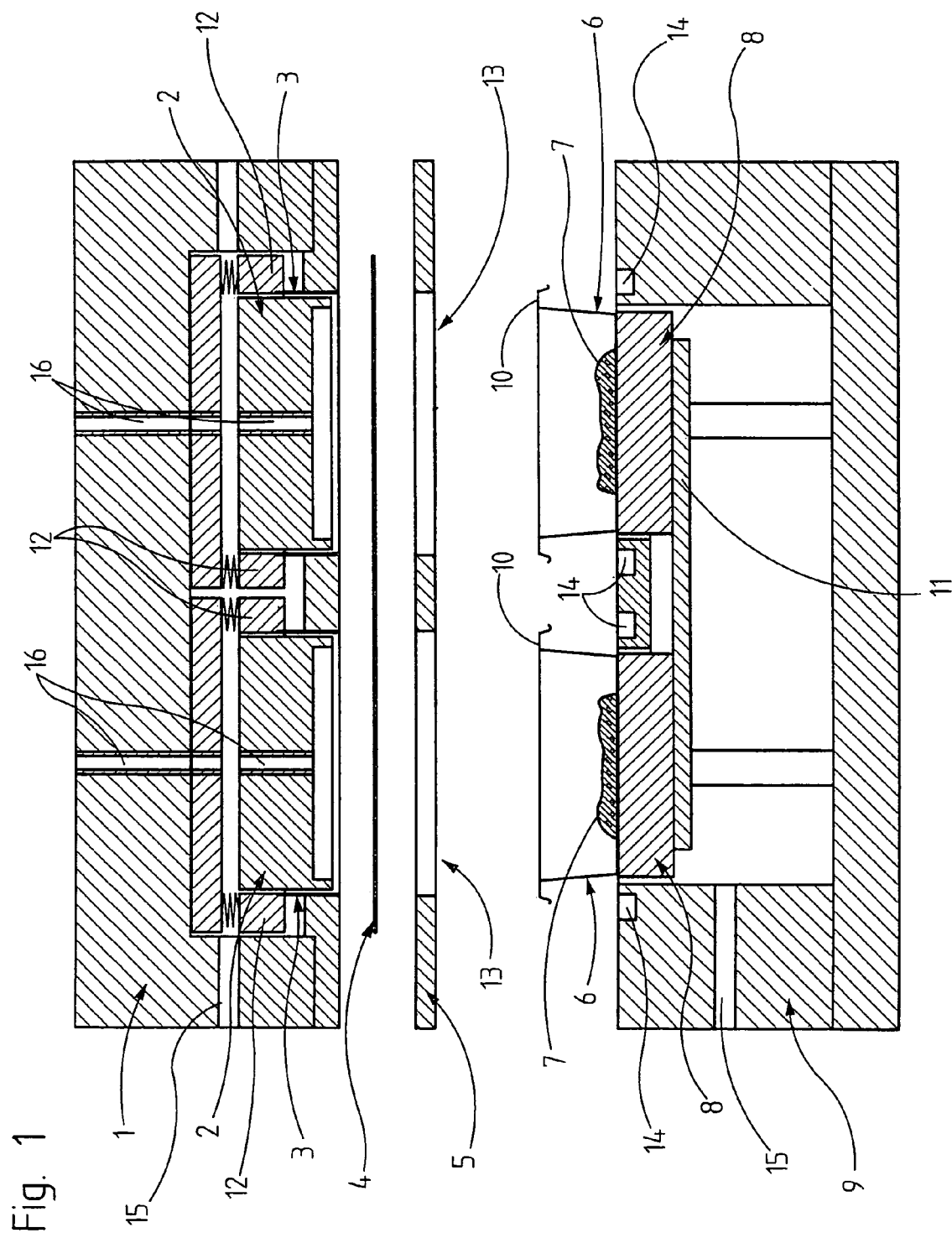

The device in the figures has a lower tool 9 and an upper tool 1. Lower tool 9 includes two supporting tables 8 for two trays 6. Each of the trays has a peripheral rim 10. Supporting tables 8 are set up on a height-adjustable frame 11.

Two sealing tools 2 are accommodated in upper tool 1. Upper tool 1 is designed to be completely height-adjustable.

Cutting devices 3 which are configured as knives moving around sealing tools 2 are spatially assigned to sealing tools 2. Cutting devices 3 are accommodated in spring-suspended knife holders 12.

FIG. 1 also shows a deep-drawable film 4. Prior to being sealed onto peripheral rims 10 of trays 6, this film 4 is in one piece.

The device has a spacer plate 5 between deep-drawable film 4 and trays 6. This spacer plate 5 has openings 13 that correspond with trays 6.

A supporting apparatus is assigned to supporting tables 8 in the region of lower tool 9. This supporting apparatus is formed by the top sections of lower tool 9. Depressions 14 into which peripheral rims 10 of trays 6 may protrude are introduced in the surface of lower tool 9 in the region of this supporting apparatus.

Figure 2:
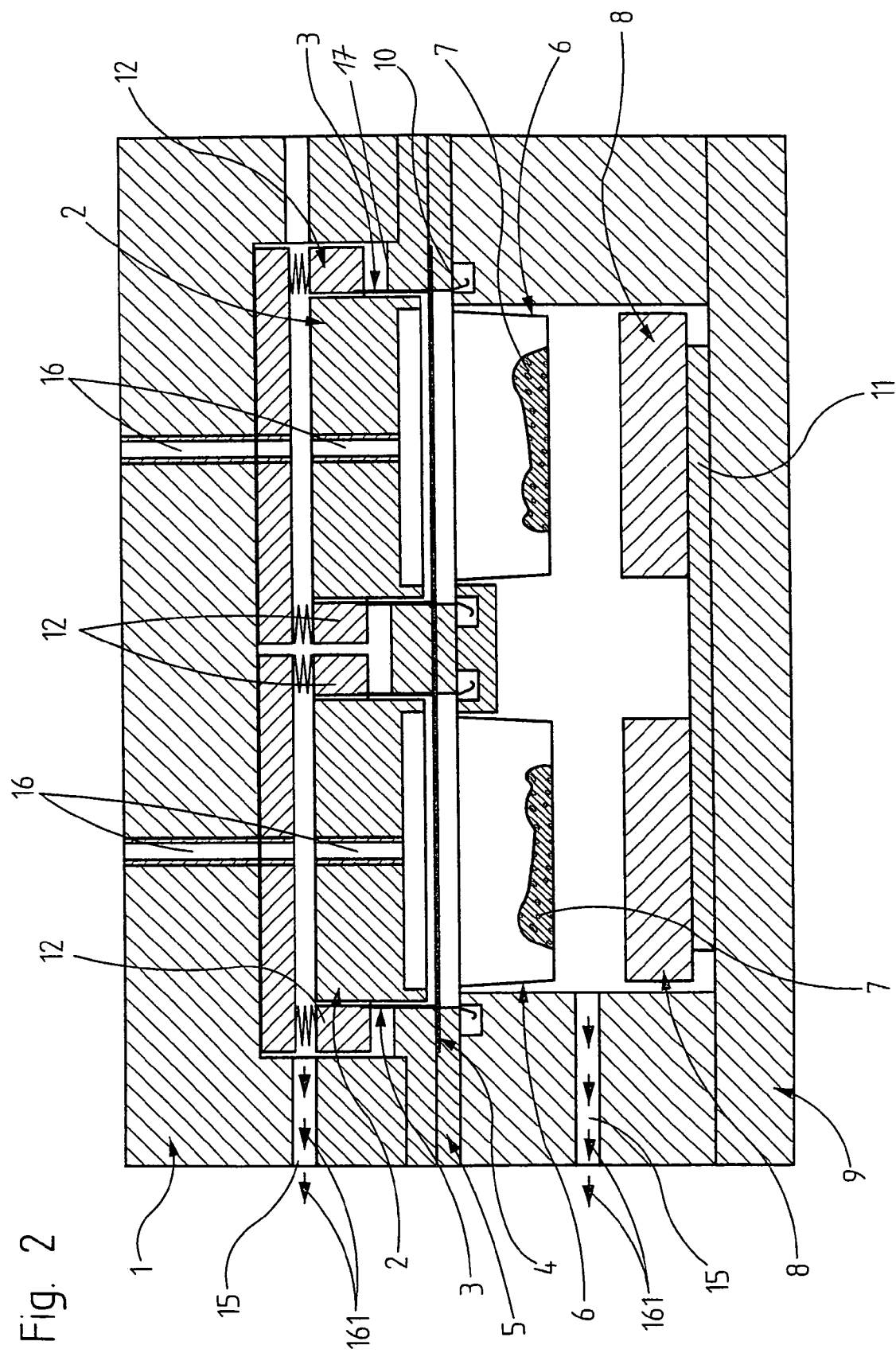

FIG. 2 shows the state after lowering of supporting tables 8 via frame 11. Trays 6 are placed on the supporting apparatus of lower tool 9. Their peripheral rims 10 are supported by lower tool 9.

Spacer plate 5 is placed on the lower tool. Deep-drawable film 4 rests on spacer plate 5, and upper tool 1 having sealing tools 2 and cutting devices 3 is moved to film 4. Cutting devices 3 are already almost on film 4, and they are moved along the assigned edges of spacer plate 5 at a close distance when they come closer to trays 6, as shown in FIG. 3.

FIG. 2 also shows that air is suctioned via air channels 15 out of the surrounding region of trays 6 (arrow 161). This creates a vacuum in the surrounding region of trays 6.

Figure 3:
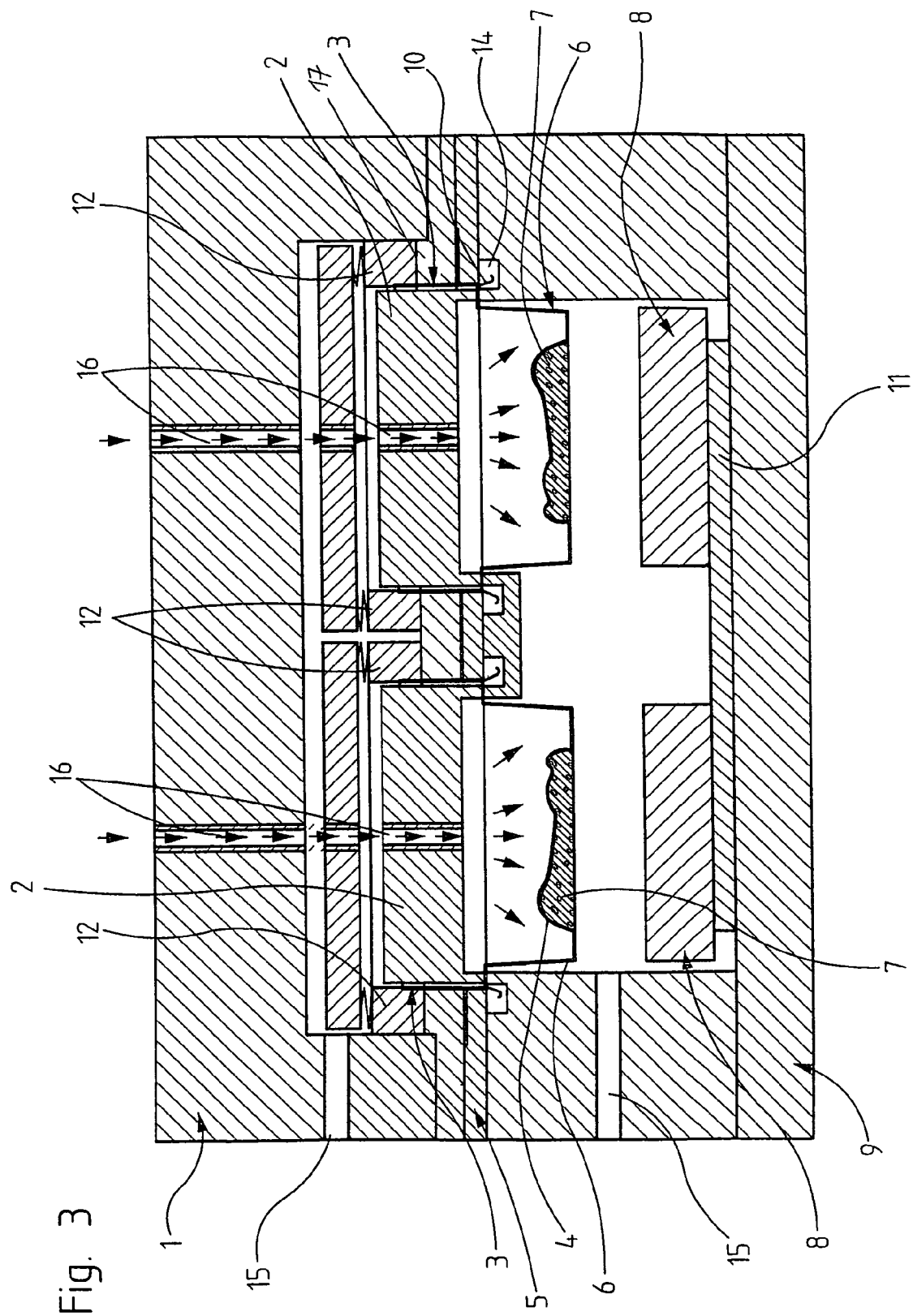

In FIG. 3, cutting devices 3 are not moved all the way to peripheral rims 10 of trays 6. The lowest position of holders 12 of cutting devices 3 rests on stops 17. These stops 17 keep cutting devices 3 at a distance from peripheral rims 10. Therefore, these rims 10 are not cut by cutting devices 3 since cutting devices 3 are able to recede in a spring-like manner into their knife holders 12. Sealing tools 2 are then used to heat-seal the cut regions of deep-drawable film 4 onto peripheral rims 10. Film 4 is heated at the same time in preparation for the deep-draw operation. In addition, air which ensures tight fitting of the heated deep-drawable film 4 on objects 7 located in trays 6 in connection with the vacuum prevailing in the region of trays 6 is supplied via overpressure lines 16 through upper tool 1 and sealing tools 2. Objects 7 may be meat products, for example.

FIG. 4 shows the state of the device after ejection of trays 6. Upper tool 1 and lower tool 9 are separated and spacer plate 5 is lifted from trays 6. The scraps of deep-drawable film 4 remaining after cutting are removed. After the sealing operation, trays 6 may be removed from lower tool 9 which is then able to accommodate new trays 6. In this context, the device may function in cycles, e.g. with 6 cycles per minute.

The device of the present invention may also be a sealing device via which trays may be sealed using films that are not deep-drawn via the skin method. The same device may therefore be used for different packaging types in which identical standardized basic packaging such as trays 6 are used.

Deep-drawable film 4 is cut to size, this film 4 is heat-sealed onto peripheral rims 10, and film 4 is deep-drawn preferably in the same cycle to shorten the processing time.

Cutting devices 3 are not directed through the plane of peripheral rims 10. FIG. 5 shows that deep-drawable film 4 is cut cleanly and that a region of peripheral rim 10 free of film 4 remains in the region of this peripheral rim 10. Cutting devices 3 do not cut peripheral rim 10 and therefore are also not able to be damaged by sections of the objects to be packaged protruding beyond rim 10, such as ice or bones.

Film 4 fits tightly on the walls of container 6 and on objects 7 present in the depression of the container, as shown in FIG. 5.

What is claimed is:

1. A method for the gastight packaging of objects in a tray, the tray having a peripheral rim, the method comprising the steps of:
    a) supporting the tray on a supporting surface;
    b) placing the object in the tray;
    c) placing a deep-drawable film on a spacer plate disposed on the peripheral rim of the tray, the spacer plate being arranged between the deep-drawable film and the peripheral rim and the spacer plate having an opening therethrough, wherein the opening is smaller than the peripheral rim;
    d) cutting the deep drawable film with a cutting device spatially assigned to a sealing tool and moving around the sealing tool to form a film portion having a size corresponding to the opening in the spacer plate;
    e) keeping the cutting device at a distance from the peripheral rim of the tray by providing a stop; and
    f) sealing the cut film portion to the tray.

2. The method as recited in claim 1, wherein the step of sealing the film portion to the tray further comprises heat-sealing the film portion to the tray.

3. The method as recited in claim 1, further comprising the step of providing a vacuum in a surrounding region of the tray.

4. The method as recited in claim 1, further comprising the step of forming an overpressure in a surrounding region of the deep-drawable film on a side facing away from the tray.

\* \* \* \* \*